United States Patent
Brown et al.

(10) Patent No.: US 6,945,157 B2
(45) Date of Patent: Sep. 20, 2005

(54) AUTOMATIC FLAVOR-INJECTED BLENDING APPARATUS AND METHOD

(75) Inventors: William Brown, Orlando, FL (US); Eric R. Miller, Deland, FL (US)

(73) Assignee: Archibald Brothers International, Inc., Deland, FL (US)

( * ) Notice: Subject to any disclaimer, the term of this patent is extended or adjusted under 35 U.S.C. 154(b) by 436 days.

(21) Appl. No.: 10/120,772

(22) Filed: Apr. 11, 2002

(65) Prior Publication Data

US 2002/0189460 A1 Dec. 19, 2002

Related U.S. Application Data

(60) Provisional application No. 60/283,124, filed on Apr. 11, 2001.

(51) Int. Cl.[7] ........................... A23L 2/00; B02C 19/00; B67D 5/00
(52) U.S. Cl. ........................... 99/275; 99/290; 99/300; 222/129.1; 222/146.6
(58) Field of Search ........................... 99/275, 290, 300, 99/484; 222/129.1, 129.3, 146.6; 62/70, 390, 392, 394, 331

(56) References Cited

U.S. PATENT DOCUMENTS

| | | |
|---|---|---|
| 1,681,929 A | 8/1928 | De Armond et al. |
| 1,957,391 A | 5/1934 | Costakos |
| 2,051,883 A | 8/1936 | Morgan |
| 2,462,019 A | 2/1949 | Bowman |
| 2,707,911 A | 5/1955 | Charpiat |
| 2,712,887 A | 7/1955 | King |
| 2,736,274 A | 2/1956 | Atkins |
| 2,765,234 A | 10/1956 | Schmitt et al. |
| 2,855,007 A | 10/1958 | Erickson et al. |
| 3,106,895 A | 10/1963 | Hood |
| 3,276,633 A | 10/1966 | Rahauser |
| 3,295,997 A | 1/1967 | Tomlinson et al. |
| 3,460,717 A | 8/1969 | Thomas |
| 3,830,407 A | 8/1974 | Wierlo |
| 3,934,759 A | 1/1976 | Giannella et al. |
| 3,987,715 A | 10/1976 | Muller |
| 4,580,905 A | 4/1986 | Schwitters et al. |
| 4,822,175 A | 4/1989 | Barnard et al. |
| 4,828,866 A | 5/1989 | Wade et al. |
| 4,881,663 A | 11/1989 | Seymour |
| D305,973 S | 2/1990 | Barnard et al. |
| D309,399 S | 7/1990 | Barnard et al. |
| D309,400 S | 7/1990 | Barnard et al. |
| 4,946,287 A | 8/1990 | Barnard et al. |
| 4,988,529 A | 1/1991 | Nakaya et al. |
| 5,056,686 A | 10/1991 | Jarrett |
| 5,152,429 A | 10/1992 | Billings |
| 5,159,818 A | 11/1992 | Etou et al. |
| 5,203,366 A | 4/1993 | Czeck et al. |
| 5,251,790 A | 10/1993 | Cohn et al. |
| D345,488 S | 3/1994 | Barnard et al. |

(Continued)

Primary Examiner—Reginald L. Alexander
(74) Attorney, Agent, or Firm—Allen, Dyer, Doppelt, Milbrath & Gilchrist, P.A.

(57) ABSTRACT

An automatic flavor-injected blending apparatus includes a base, a processor, and a user input in signal communication with the processor. A blending spindle is rotatably affixed at an upper end to the base and is rotatable under processor control. A container support is movably affixed to the base and is movable between a lower position for placing a container thereon and an upper position closer to the spindle's upper end. A selected flavor is injectable into the container. Software is resident in the processor that is adapted to receive the flavor selection and actuate the injection. The software is further adapted to actuate the spindle rotation. Since the blending process is automated, the server can start the apparatus, step away and attend to other duties while the apparatus is functioning, and return at a later time after a timer has turned off the spindle rotator.

18 Claims, 3 Drawing Sheets

U.S. PATENT DOCUMENTS

| | | |
|---|---|---|
| 5,305,923 A | 4/1994 | Kirschner et al. |
| 5,306,083 A | 4/1994 | Caldwell et al. |
| 5,323,691 A | 6/1994 | Reese et al. |
| 5,341,957 A | 8/1994 | Sizemore |
| D364,175 S | 11/1995 | Alpers et al. |
| 5,464,120 A | 11/1995 | Alpers et al. |
| 5,553,749 A | 9/1996 | Oyler et al. |
| 5,653,157 A | 8/1997 | Miller |
| 5,960,701 A * | 10/1999 | Reese et al. .................. 99/275 |

* cited by examiner

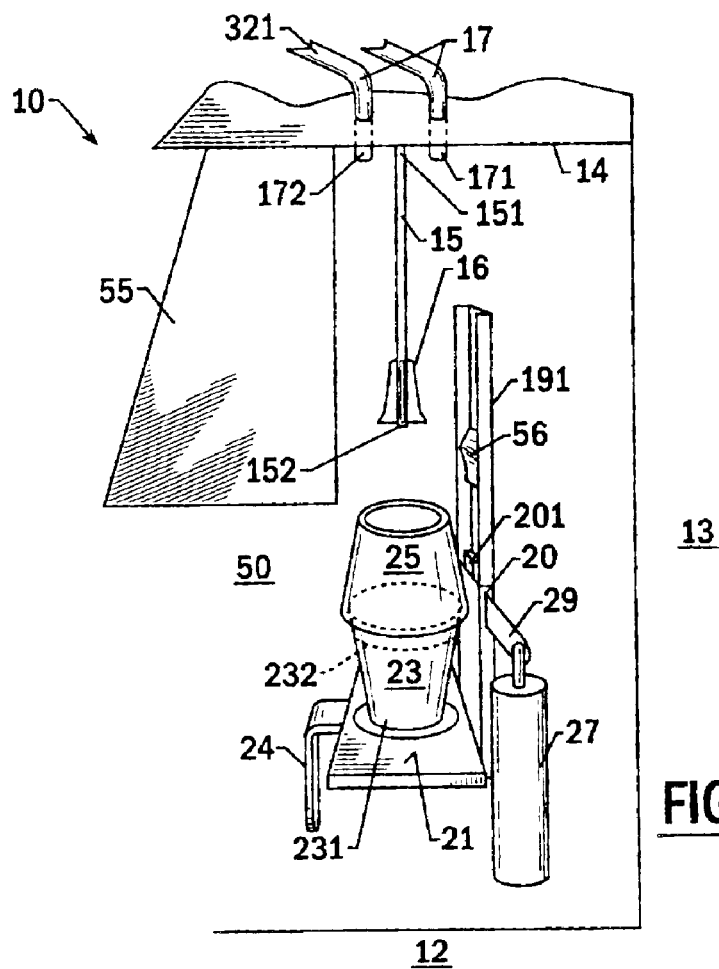
FIG. 2.
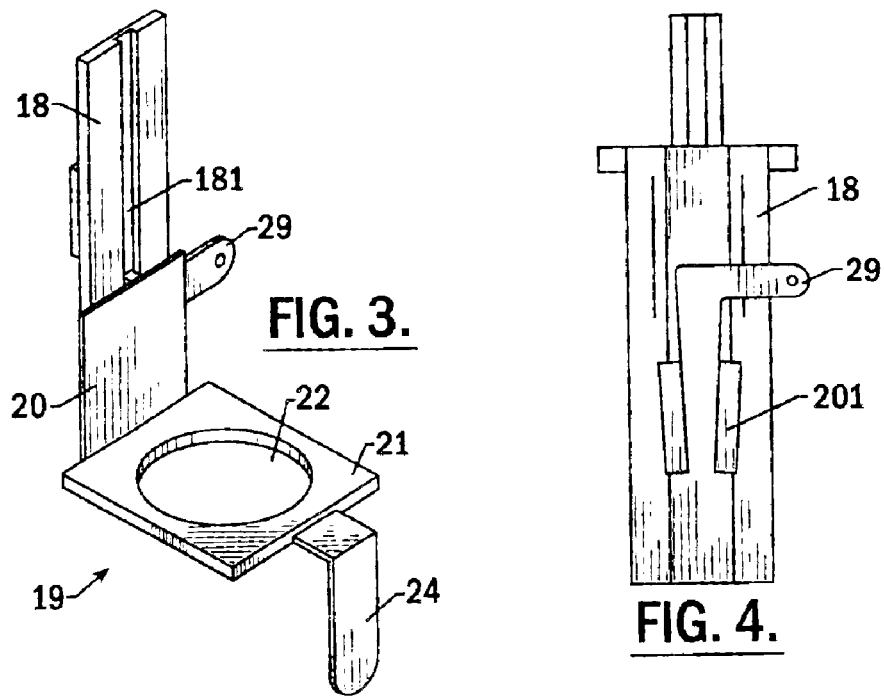
FIG. 3.
FIG. 4.

AUTOMATIC FLAVOR-INJECTED BLENDING APPARATUS AND METHOD

CROSS-REFERENCE TO RELATED APPLICATION

This application claims priority from provisional application Ser. No. 60/283,124, "Automatic Flavor-Injected Blending Apparatus and Method," filed Apr. 11, 2001.

BACKGROUND OF THE INVENTION

1. Field of the Invention

The present invention relates generally to the dispensing and mixing of multi-flavored drinks and semisolid foods such as milkshakes, frozen custards, slushes, slurries, and the like, and more particularly to an efficient and cost effective method of preparing a flavored shake or slurry.

2. Description of Related Art

Beverage dispensing systems are used to provide consumers with beverages that are typically a mixture of previously stored concentrate and water. Further, milk shake machines are available for use in fast-food-styled restaurants, but such machines are typically expensive. In addition, storage of product used is typically within the machine thus demanding expensive retail space for placement and convenient use.

By way of example, U.S. Pat. No. 5,056,686 to Jarrett discloses a beverage dispensing system for providing different flavored drinks mixed from concentrate and water. Containers including the different flavors of concentrate are stored for pumping to a hand held, "bar-gun" styled, dispensing nozzle. Valves within the dispensing head control the concentrate discharge when a selected beverage is desired, and an appropriate amount of concentrate and water are discharged simultaneously to ensure that the end beverage contains the desired mixture. User operated vending machines, such as that described in U.S. Pat. No. 5,341,957 to Sizemore, discloses a cup-type vending system which includes a currency output device and automatically outputs a beverage into a cup in response to a payment and selection of a beverage. The vending machine includes a plurality of disposable containers of beverage syrup, such as "bag-in-box" packages, stored in an auxiliary cabinet. A dispensing system functions to draw syrup from the disposable containers and selectively dispense a predefined or selected amount of syrup into an awaiting cup. The system includes pumping stages wherein one stage draws a selected amount of syrup from a package through a feed conduit and discharges the selected amount through a nozzle into the cup.

By way of further example, U.S. Pat. No. 3,295,997 to Tomlinson et al. discloses a milk shake machine which include a mixer for reducing pre-frozen flavored ingredients stored within a container to a flavored milk shake with the addition of a preselected amount of milk supplied from a milk storage tank carried by the machine. U.S. Pat. No. 5,323,691 to Reese et al. discloses a frozen drink mixer for preparing blended beverages, particularly frozen drinks, in which an ice dispenser, liquid mix dispenser, and blender are combined into a single unit. The apparatus automatically delivers an appropriate amount of ice and liquid to the blender unit and turns on the blender at an appropriate time to prepare the frozen drink of desired size. A drink mixing and dispensing machine described in U.S. Pat. No. 2,855,007 stores a mix within a tank carried by the machine and pumps the mix through a freezing chamber prior to dispensing into a cup which is held under a mixing blade. Syrup pumps are also carried within the cabinet of the machine for dispensing one or two syrups into the cup before repositioning the cup under the mixer for dispensing and mixing the syrup with the milk shape styled mix. In the known prior art, such systems are calibrated to deliver a predetermined amount of flavoring, which obviates the possibility of serving different-volume containers.

While a variety of milk shake styled syrup dispensing and mixing devices and methods are known in the art, there remains a need for an economical method for efficiently and cost effectively providing a customer with a plurality of options for a milk shake flavored as desired by the customer, including varied sizes and flavors. Further, the currently known systems require manual holding and movement of the cup during the blending process, which in a fast-food-style environment is too time-intensive.

SUMMARY OF THE INVENTION

It is therefore an object of the present invention to provide an automatic flavor-injected blending apparatus and a method of use.

It is another object to provide such an apparatus and method for making a plurality of sized blended foodstuffs.

It is an additional object to provide such an apparatus and method that decreases human interaction time.

It is a further object to provide such an apparatus and method that includes an inventory function.

It is also an object to provide such an apparatus and method that includes an ability to monitor a temperature of a material to be used in the blended foodstuff.

It is yet an additional object to provide an apparatus and method for tracking consumption data on a foodstuff.

It is yet another object to provide such an apparatus and method for relaying tracked consumption data to a remote site.

These and other objects are achieved by the present invention, an automatic flavor-injected blending apparatus. The apparatus comprises a base, a processor, and user input means in signal communication with the processor. The input means has means for entering a flavor selection chosen from a plurality of flavor selections.

The apparatus further comprises a blending spindle that is rotatably affixed at an upper end to the base. The spindle has a blending blade adjacent a lower end thereof. Means for rotating the spindle is under processor control. A container support, which is adapted to hold, for example, a cup, is movably affixed to the base. The container support has a support surface adapted to hold a container thereon. The container support is movable between a lower position for placing the container thereon and an upper position wherein the support surface is closer to the spindle's upper end.

Means under processor control inject the selected flavor into the container.

Software means are resident in the processor that is adapted to receive the flavor selection and actuate the injecting means. The software means is further adapted to actuate the spindle rotating means and lower the container support from the upper position to the lower position.

The method of the present invention is for automatically preparing a flavor-blended comestible responsive to an order therefor. The method comprises the steps of This system achieves an automatic process and apparatus therefor for mixing a comestible product in a container such as a cup, for example. The comestible may comprise, but is not intended to be limited to, a milk shake, fruit shake, smoothie, or frozen dessert. Since the blending process is automated, the server can start the apparatus, step away and attend to other duties while the apparatus is functioning, and return at a later time after the timer has turned off the spindle rotator. Further, an improved quality and perception of improved quality are both achieved, since the blending occurs at the time of order, and the consumer is served a freshly prepared product.

As an additional feature of the present invention, the software means is also adapted to track consumption data based upon operator input. An output in signal communication with the processor provides means for relaying consumption information tracked by the processor to a remote site. Such a feature is not intended to be limited to the beverage apparatus aspect of the present invention, and will be seen by one of skill in the art to provide benefit for inventorying and tracking consumption data from any point-of-sale outlet.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 2 is a side perspective view of the blending apparatus.

FIG. 3 is a top side view of the cup holder.

FIG. 4 is a front view of the cup holder bracket.

DETAILED DESCRIPTION OF THE PREFERRED EMBODIMENTS

A description of the preferred embodiments of the present invention will now be presented with reference to FIGS. 1–6.

Figure 1:
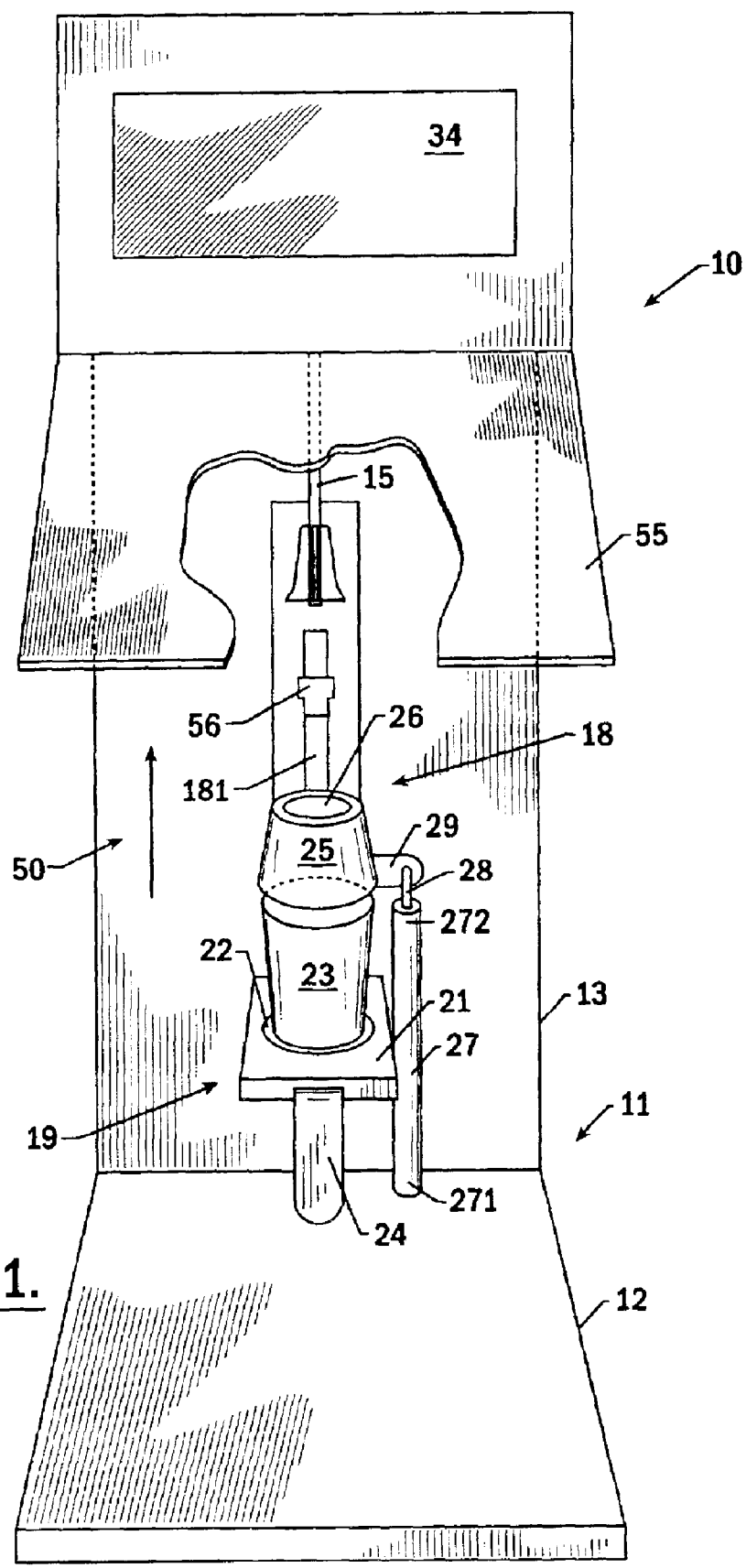
FIG. 1 is a front perspective view of the blending apparatus.
Figure 5:
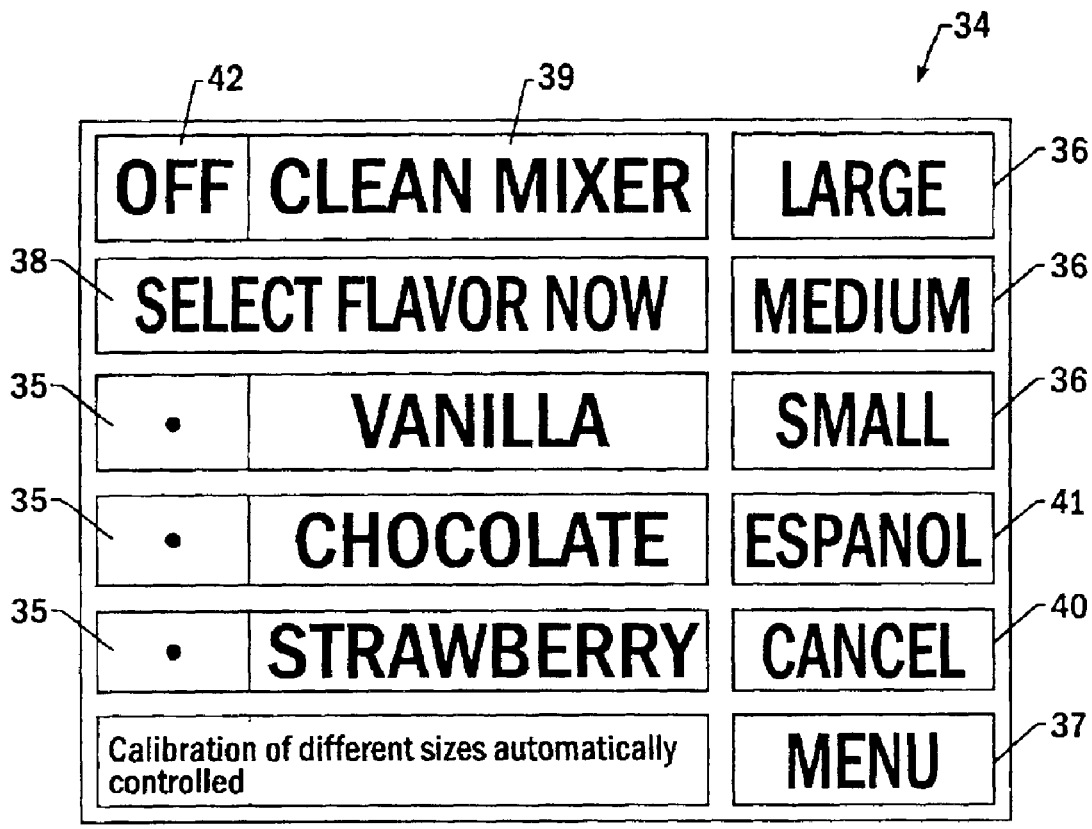
FIG. 5 is a front view of the selection touch screen.

Front and side views of the apparatus 10 of the present invention are shown in FIGS. 1 and 2, and a schematic diagram in FIG. 7. The functions of the apparatus 10 are under control of a processor 30, which has resident thereon software 53 for performing the control calculations and functions (FIG. 10).

A base of the apparatus 10 comprises a housing 11 that has a substantially horizontal bottom 12 positionable on a serving surface such as a counter. A substantially vertical back 13 extends upward from a back edge of the bottom 12. A shelf 14 extending substantially horizontally forward of the back 13 and above the bottom 12 forms a space 50 enclosed on three sides. Depending from the underside of the shelf 14 at its upper end 151 is a rotatable spindle 15 that has a plurality of blending blades 16 adjacent a lower end 152. The spindle 15 is rotatable by a motor 52, the actuation of which is under processor 30 control, as will be discussed in the following.

Through the shelf 14 extend a plurality of ports 17 for injecting flavoring therethrough from a plurality of reservoirs 33. Each reservoir 33 holds a unitary flavoring in a flowable state. A pump 32 is in fluid communication with a line 321 leading from each reservoir 33 to an inlet 171 of a respective port 17. Each port 17 further has an outlet 172, the outlets 172 positioned adjacent and in surrounding relation to the spindle's top end 151.

Affixed to the back 13 within the space 50 is a cup holder bracket 18 (see FIGS. 3 and 4) having a holder stop 56 positioned within a groove 181 in the bracket 18. The holder stop 56 comprises a switch in signal communication with the processor 30. Slidably affixed to the bracket 18 is a cup holder 19 that comprises a traveling attachment portion 20 having a slider 201 that is insertable into the bracket 18 and is slidable relative thereto and a support surface 21 extending generally horizontally outward from the attachment portion 20. The holder stop 56 serves to limit the upward motion of the cup holder 19 and thereby define the upper position of the cup holder 19.

The support surface 21 has a generally circular hole 22 therethrough that is dimensioned to hold a bottom portion of a cup 23. A handle 24 depends downward from the front of the support surface 21. In a preferred embodiment the cup 23 will contain a frozen neutral-flavored product, and a generally dome-shaped lid 25 is placed thereatop that has a hole 26 dimensioned to permit the spindle blades 16 therethrough and to permit an injection of flavoring through the ports 17.

An actuator 27 such as is known in the art is affixed at a bottom end 271 to the bottom 12 adjacent the back 13. The actuator 27 has a movable arm 28 extending from the top 272 thereof that is attached to a protrusion 29 extending from the cup holder's attachment portion 20. In this application the user places a cup 23 in the hole 26 when the cup holder 19 is in the lower position and lifts the handle 24 until the attachment portion 20 reaches the holder stop 56, with the cup holder 19 in the upper position.

When activated, the arm 28 moves up and down for a predetermined amount of time while the spindle 15 is rotating, thereby moving the cup holder bracket 18 and the cup 23 for a predetermined time to sufficiently blend the selected product. Preferably the arm 28 moves over a sufficient vertical range in order to translate the spindle blades 16 from adjacent the cup's bottom 231 to adjacent a fill level 232 of the cup 23, in order to achieve a desired complete mixing of the flavoring into the neutral-flavored product. The software 53 thus is adapted to direct a repetitive vertical movement of the cup holder bracket 18 relative to the spindle 15 in a range of motion between a first blending position and a second blending position, wherein the upper position is contained within that range of motion.

A substantially transparent shield 55 is affixed to the housing 11 depending from the shelf 14. The shield 55 forms a three-sided protective guard around the spindle 15 in order to prevent splash and also to minimize user contact with the spindle 15 during operation.

Housed atop the shelf 14 is the processor 30 that, with the resident software 53, controls the functions and timing of the apparatus 10. The processor 30 is in signal communication with a plurality of relays 31 that in turn control a plurality of pumps 32. Each pump 32 is in fluid communication with a reservoir 33 of flavoring, such as a syrup. Fluid lines 321 lead from each reservoir 33 to the ports 17 to deliver the flavoring to the cup 23.

Figure 6:
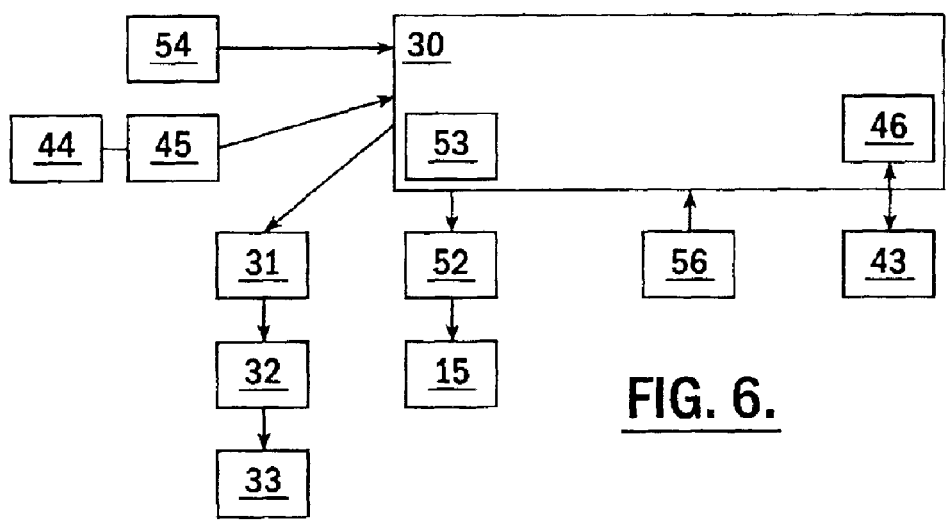
FIG. 6 is a schematic diagram of the system.

The software 53 is in communication with a timer 54 housed with the processor 30 and is adapted to receive a signal entered by the user, for example, for determining which reservoir 33 to tap, and for how long to run the pump 32, comprising a first predetermined time. The type of flavoring is based upon the selected product flavor, and the amount of flavoring is based upon the selected product volume. The signal also determines blending duration, which is dependent, for example, upon such criteria as the product size and type selected and product viscosity (FIG. 6). The blending duration comprises a second predetermined time.

An input signal is entered by the user via a touch screen 34 such as depicted in FIG. 9, although this configuration and the selections thereon are not intended as limitations. The touch screen 34 is in signal communication with the processor 30. The touch screen 34 is a preferred, although not exclusive, input device because it is readily adaptable and reprogrammable to different situations as desired. For example, as shown in FIG. 9, three flavors 35 and three sizes 36 are available. In addition, prompts to the user are provided to permit different screens to be displayed on a menu 37, select a flavor 38, clean the apparatus 39, cancel an order 40, change language 41, and turn the apparatus off 42. These choices are exemplary and not intended to be limiting, and one of skill in the art will recognize that any configuration and arrangement of selections is possible. As the apparatus 10 is under processor 30 control, it will be seen that a virtually limitless array of options can be programmed, which is important in being adaptable to different settings, and, make allowances for viscosity of the product and a tested required blending time for certain flavorings that require a longer blending time than others. The processor 30 also controls the speed of the actuator's travel up and down, which is programmable for desired product.

An additional feature of the invention comprises means for tracking a temperature of a freezer 44 in which the cup of neutral-flavored product is stored prior to blending. A sensor 45 in the freezer 44 has an output leading to an input to the processor 30, where the software 53 is also adapted to monitor the temperature to assure that it stays within a predetermined acceptable range. If the temperature falls out of that range, an alarm is sent to the screen 34 for viewing by the user.

The present apparatus 10 has in an exemplary embodiment been tested to require approximately 7 sec to set up and 3 sec to release the completed product, a total of 10 sec operator time, which makes possible the use of this apparatus 10 in settings wherein minimizing operator intervention time is a critical, such as fast food and other take-out-type restaurants.

In an alternate embodiment, the desired product may require no flavoring to be added by the apparatus 10. For example, in the type of product having a nonfluid additive such as crushed cookies or small candies, the operator would add the additive to the cup 23 prior to positioning the cover 25 and placing the cup 23 in the holder's hole 26. Then the automatic blending process can ensue.

Another aspect of the present invention, which may be considered distinct from the blending apparatus milieu, comprises means for tracking product consumed, with all the associated data such as flavors, sizes, alarm status, etc. The software 53 tracks these data and is adapted to output them to a remote site 43, whether at the same location but a different computer or a distant central data processing center, such as a corporate headquarters. A modem 46 in electronic communication with the processor 30 provides an exemplary channel for outputting these data, which, as will be understood by one of skill in the art, is readily configurable to a desired functionality.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims. A timer that is under processor control times an activation of the rotating means based upon the product flavor and the product volume while the support is in the upper position.

What is claimed is:

1. An automatic flavor-injected blending apparatus comprising:
    a base comprising a housing having:
        a substantially horizontal bottom positionable upon a serving surface;
        a substantially vertical back extending upward from a back edge of the bottom;
        a shelf extending substantially horizontally from the back and above the bottom, a partially enclosed space formed by the bottom, the back, and the shelf, the spindle affixed to and extending beneath the shelf into the space, the container support affixed to the back;
    a processor;
    user input means in signal communication with the processor, the user input means having means for entering a flavor selection chosen from a plurality of flavor selections;
    a blending spindle rotatably affixed at an upper end to the base, the spindle having a blending blade adjacent a lower end thereof;
    means for rotating the spindle under control of the processor;
    a container support movably affixed to the base, the container support having a support surface adapted to hold a container thereon and movable between a lower position and an upper position wherein the support surface is closer to the spindle upper end, the container support comprising:
        a bracket affixed to the back within the space, the bracket having a substantially vertical groove therein; and
        a cup holder comprising:
            an attachment portion having a slider insertable into and slidable within the bracket groove; and
            a support surface extending substantially horizontally outward from the attachment portion;
    means for injecting the selected flavor into the container; and
    software means resident in the processor adapted to:
        actuate the injecting means; and
        actuate the spindle rotating means.

2. The apparatus recited in claim 1, wherein:
    the shelf has a plurality of ports therethrough, an outlet of each port positioned adjacent the spindle top end; and
    the flavor injecting means comprises a line leading from each of a plurality of flavor reservoirs to an inlet of a respective port and a plurality of pumps, each pump in fluid communication with a respective line for pumping flavor from the reservoir corresponding to the selected flavor through the respective line to the corresponding port inlet.

3. The apparatus recited in claim 2, wherein the software means is further adapted to receive the entered flavor selection from the user input means, actuate the pump corresponding to the entered flavor selection, and actuate the spindle rotating means.

4. The apparatus recited in claim 3, further comprising timing means in signal communication with the processor, and wherein the software means is further adapted to access the timing means, actuate the pump for a first predetermined time, and actuate the spindle rotating means for a second predetermined time.

5. The apparatus recited in claim 4, wherein the user input means further has means for entering a product size chosen from a plurality of product sizes, and wherein the first and the second predetermined times are dependent upon the selected product size.

6. The apparatus recited in claim 1, wherein the spindle rotating means comprises a motor having a shaft affixed for rotation adjacent the spindle top end.

7. The apparatus recited in claim 1, wherein the bracket further has a holder stop positioned within the groove, for limiting an upward motion of the cup holder and for defining the upper position.

8. The apparatus recited in claim 7, wherein the cup holder further comprises a handle depending downward from the support surface, for permitting a manual movement of the cup holder between the upper and the lower positions.

9. The apparatus recited in claim 1, wherein the support surface has a substantially circular hole therethrough dimensioned for admitting a bottom portion of a cup and for restraining an upper portion of a cup.

10. The apparatus recited in claim 1, further comprising a shield member affixed to the base in at least partially surrounding relation to the spindle.

11. The apparatus recited in claim 1, wherein the injecting means comprises a pump in fluid communication with a flavoring reservoir, and further comprising means in signal communication with the software means for controlling the actuation of the pump.

12. The apparatus recited in claim 11, wherein the controlling means comprises a relay.

13. The apparatus recited in claim 1, wherein the user input means comprises a touch screen.

14. The apparatus recited in claim 1, wherein the user input means further has means for entering a desired product size.

15. The automatic favor-injected blending apparatus comprising:
a base;
a processor;
user input means in signal communication with the processor, the user input means having means for entering a flavor selection chosen from a plurality of flavor selections;
a blending spindle rotatably affixed at an upper end to the base, the spindle having a blending blade adjacent a lower end thereof;
means for rotating the spindle under control of the processor;
a container support movably affixed to the base, the container support having a support surface adapted to hold a container thereon and movable between a lower position and an upper position wherein the support surface is closer to the spindle upper end;
means for injecting the selected flavor into the container;
software means resident in the processor adapted to:
actuate the injecting means; and
actuate the spindle rotating means; and
an actuator having a first end affixed to the base and a second end affixed to the container support, the actuator comprising means for moving the container support in a vertical direction, the moving means in signal communication with the processor, and wherein the software means is further adapted to direct the moving means to effect a repetitive vertical movement of the container support relative to the spindle in a range of motion between a first blending position and a second blending position, the upper position contained within the range.

16. An automatic flavor-infected blending apparatus comprising:
a base;
a processor;
a temperature sensor positionable in a preblended product freezer, the sensor in signal communication with the processor;
user input means in signal communication with the processor, the user input means having means for entering a flavor selection chosen from a plurality of flavor selections;
a blending spindle rotatably affixed at an upper end to the base, the spindle having a blending blade adjacent a lower end thereof;
means for rotating the spindle under control of the processor;
a container support movably affixed to the base, the container support having a support surface adapted to hold a container thereon and movable between a lower position and an upper position wherein the support surface is closer to the spindle upper end;
means for injecting the selected flavor into the container; and
software means resident in the processor adapted to:
actuate the injecting means;
actuate the spindle rotating means; and
receive a sensed temperature from the sensor and issue an alarm if the sensed temperature is outside a predetermined acceptable range.

17. The apparatus recited in claim 16, further comprising a user output device in signal communication with the processor, and wherein the software means is further adapted to display the issued alarm on the user output device.

18. An automatic flavor-infected blending apparatus comprising:
a base;
a processor;
means in signal communication with the processor for interfacing with another processor;
user input means in signal communication with the processor, the user input means having means for entering a flavor selection chosen from a plurality of flavor selections;

a blending spindle rotatably affixed at an upper end to the base, the spindle having a blending blade adjacent a lower end thereof;

means for rotating the spindle under control of the processor;

a container support movably affixed to the base, the container support having a support surface adapted to hold a container thereon and movable between a lower position and an upper position wherein the support surface is closer to the spindle upper end;

means for injecting the selected flavor into the container; and software means resident in the processor adapted to:
    actuate the injecting means;
    actuate the spindle rotating means; and
    track the entered flavor selection and to transmit the entered flavor selection via the interfacing means to another processor.

\* \* \* \* \*